United States Patent Office 2,862,978
Patented Dec. 2, 1958

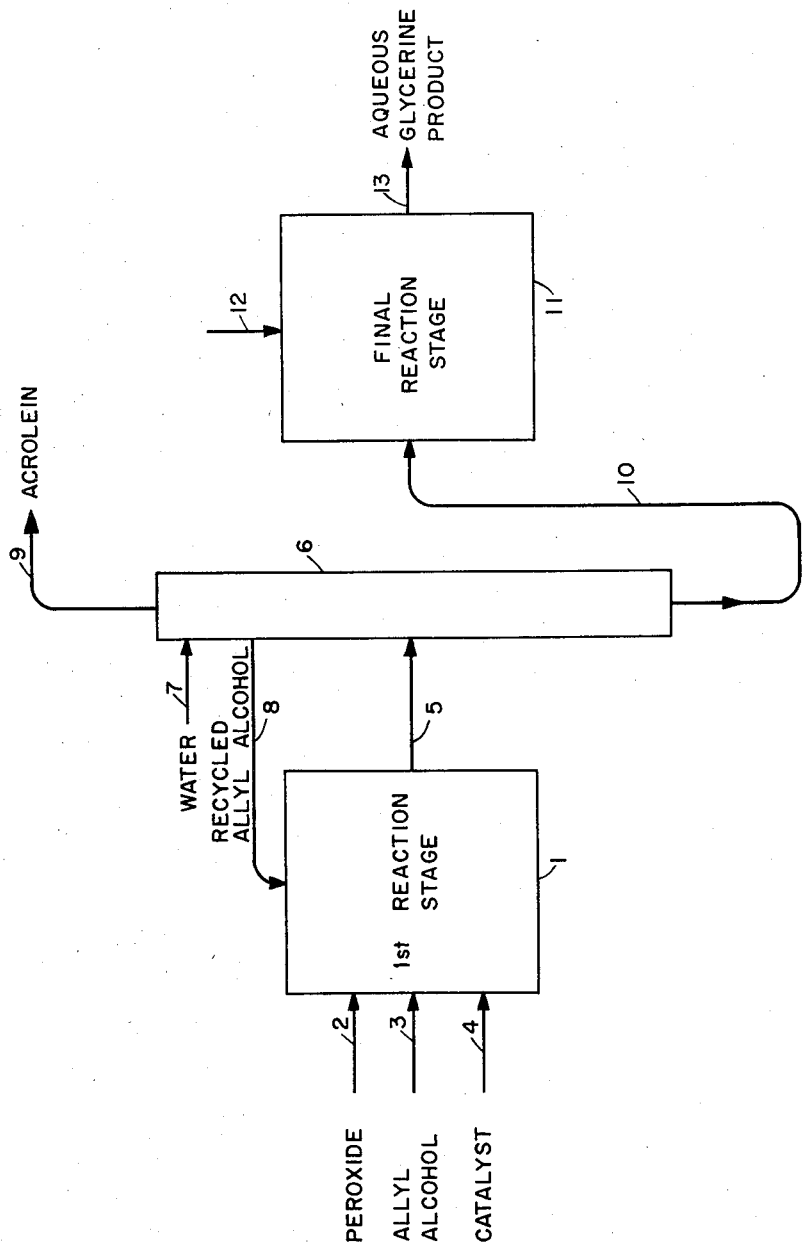

2,862,978

SYNTHETIC GLYCERINE PRODUCTION WITH INTERMEDIATE REMOVAL OF ACROLEIN

John R. Skinner, Oakland, Charles H. Wilcoxen, Jr., San Lorenzo, and George J. Carlson, Berkeley, Calif., assignors to Shell Development Company, New York, N. Y., a corporation of Delaware Application April 25, 1957, Serial No. 655,061

8 Claims. (Cl. 260—635)

This invention relates to the production of glycerine by hydroxylating allyl alcohol. It deals with a new and more advantageous method for synthesizing glycerine in this way whereby high purity glycerine can be obtained efficiently and economically.

It is known that by catalytic hydroxylation of allyl alcohol with a peroxide, most advantageously hydrogen peroxide, good yields of glycerine can be obtained. A wide variety of catalysts have been used for the reaction. These include tungstic acids as described and claimed in Bergsteinsson patent, U. S. 2,373,942; formic acid, see Bergsteinsson, U. S. 2,500,599; heteropolyacids such as solenotungstic acid, berylotungstic acid and the like, see Smith, U. S. 2,754,325 and U. S. 2,773,909; organic sulfonic acids, see Smith, U. S. 2,731,502; and osmium tetroxide, see Milas, U. S. 2,414,385, for example. Still other hydroxylation catalysts which can be used for the reaction, although generally they are less advantageous than the foregoing catalysts, are described in the survey on hydroxylation reported by Mugdan and Young in the Journal of the Chemical Society (London), 1949, pages 2988–3000. Copending application Serial No. 494,552, filed March 15, 1955, now U. S. Patent 2,833,787, of which the present application is a continuation-in-part, describes and claims an especially advantageous method of producing glycerine by reacting allyl alcohol with hydrogen peroxide using acid salts of acids of tungsten and molybdenum as the catalyst, while the use of neutral tungstates as catalysts for this reaction is claimed in copending application Serial No. 555,754, filed December 28, 1955, now U. S. Patent No. 2,833,788, by the present applicants together with another.

The optimum conditions for reaction vary somewhat depending upon the particular hydroxylation catalyst which is chosen. In most cases temperatures below about 60° C. are considered preferable although Young patent, U. S. 2,613,223 recommends temperatures up to 100° C. when using tungsten or molybdenum oxides as catalysts. A more advantageous method of hydroxylating allyl alcohol with these catalysts is the process of copending application Serial No. 582,573, filed May 3, 1956, in which the reaction is carried out first at a low temperature in the range of about 40° to 60° C. and then is completed at a higher temperature.

It has been found that in all of these prior methods of producing glycerine by hydroxylation of allyl alcohol by catalytic reaction with a peroxide a side reaction takes place which results in the formation of acrolein. The amount of acrolein produced depends upon the catalyst used and the conditions of reaction employed. Under the best conditions the acrolein formation may be quite small, for instance it may represent a loss of allyl alcohol of the order of only 2 to 3%. But under less advantageous conditions loss of allyl alcohol to acrolein can be much greater. However, in the previously described methods of carrying out the reaction, the loss of glycerine yield on account of acrolein production is substantially greater than the amount of acrolein formed. This is due to the fact that during continued reaction under hydroxylation conditions the acrolein formed reacts with the glycerine produced and possibly also with the allyl alcohol present to form acetals. Such acetal formation not only results in a loss of two to three moles of allyl alcohol for each mole of acrolein produced but also causes a substantial loss of peroxide. Thus besides the peroxide lost in the oxidation of the allyl alcohol to acrolein, there is a further loss of one to three moles of peroxide per mole of acetal formed as can be seen from the following equations showing various possible reactions which may take place in the mixture:

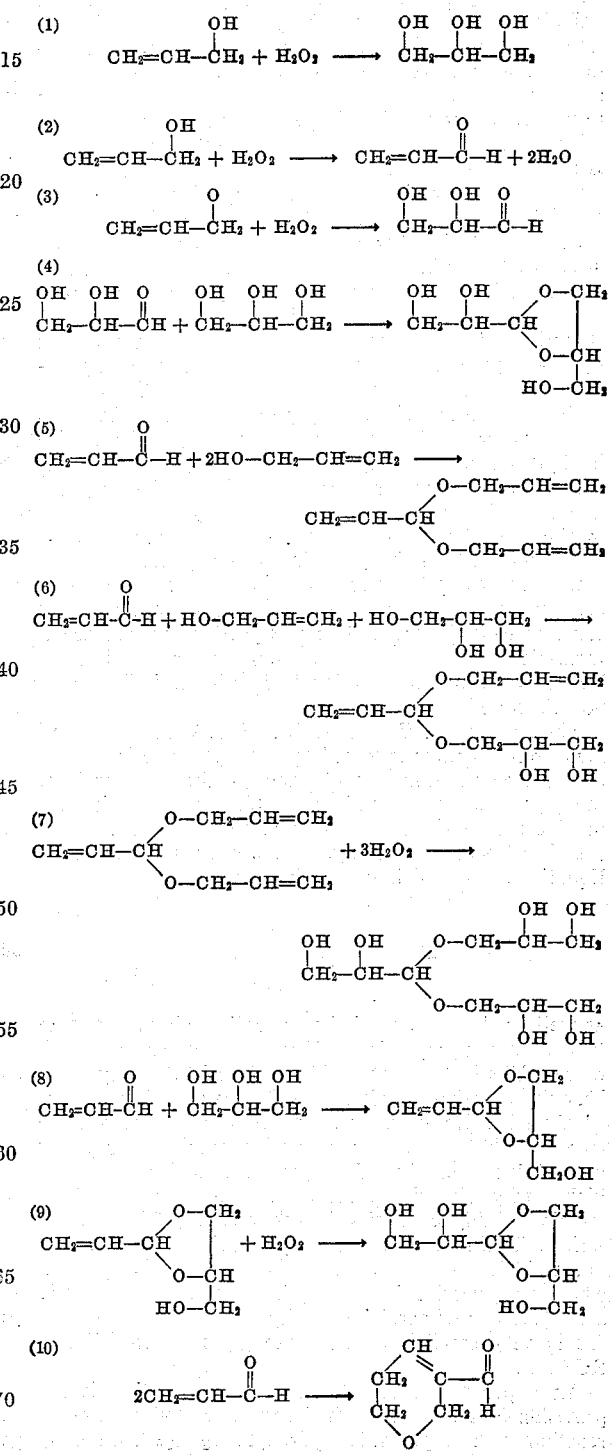

(11)

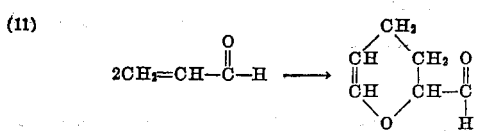

(12)

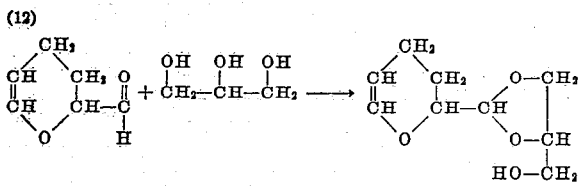

Equation 1 represents the desired hydroxylation of allyl alcohol to glycerine in which one mole of peroxide, represented as hydrogen peroxide for purposes of illustration only, is consumed per mole of glycerine produced. Equation 2 shows the side reaction leading to acrolein formation. Equation 3 represents hydroxylation of the acrolein, a reaction not encountered to any great extent under the usual conditions of allyl alcohol hydroxylation unless osmium tetroxide is used as the catalyst. In that case acetal formation by the resulting glyceraldehyde through reaction with glycerine as shown in Equation 4 causes substantial loss. Regardless of the catalyst used, the acetal formation which takes place between the acrolein and allyl alcohol or between acrolein and both allyl alcohol and glycerine as shown in Equations 5 and 6 is usually responsible for a greater loss in yield due both to consumption of allyl alcohol and of further amounts of hydrogen peroxide in hydroxylation of the resulting unsaturated acetals as shown in Equation 7 for the product of Equation 5 and similarly for the product of Equation 6. More serious, however, is the acetal formation shown in Equation 8. Not only is this acetal responsible for the loss of an equal molar proportion of glycerine and further loss of peroxide through its hydroxylation as shown in Equation 9 but also a substantial proportion appears as an impurity in the glycerine. The acrolein dimers, which are of two types as shown in Equations 10 and 11 are another source of impurities in the glycerine. They can also cause a further loss of glycerine through acetal formation as illustrated in Equation 12 for the dimer of Equation 11, that of Equation 10 forming a similar acetal not illustrated.

The products of Equations 4, 5, 6, 7, 9 and 12 are all high boiling compounds which, although undesirable by-products representing a loss in yield, can be removed from the glycerine by conventional distillation methods used in glycerine purification. The acrolein dimers and the acetals of acrolein and glycerine produced as shown in Equation 8, and which may be the isomer

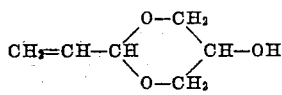

as well as the compound shown, boil at about the same temperature as glycerine. These compounds are much more difficult to remove from glycerine. They have been found to be one of the principal causes of the failure of glycerine produced by hydroxylating allyl alcohol to meet the high standards of purity required for many uses of glycerine. One of the exacting specifications which high purity glycerine must meet is the so-called RCS test for readily carbonizable substances. This test, described in United States Pharmacopoeia XV, pages 309 and 911, depends on the color imparted to the solution when the glycerine is mixed with concentrated sulfuric acid. Acetals of acrolein and glycerine even when present in very small amounts cause glycerine to fail this RCS test.

An important object of the present invention is the provision of a process for hydroxylating allyl alcohol by reaction with a peroxide hydroxylating agent whereby production of glycerine with minimized formation of undesirable by-products, particularly acrolein acetals can be achieved. Another object of the invention is to provide a process for the efficient manufacture of glycerine capable of passing the RCS test by catalytic hydroxylation of allyl alcohol. Still other objects and advantages of the invention will be apparent from the following description of the new process.

It has been found that the foregoing objects can be realized by carrying out the hydroxylation of allyl alcohol in stages with removal of the acrolein formed in the early stages of the reaction before completing the hydroxylation reaction. More specifically the process of the invention comprises reacting allyl alcohol with a peroxide hydroxylating agent in the presence of a hydroxylation catalyst until substantial reaction of the peroxide present has taken place, distilling the reaction mixture to remove therefrom the acrolein formed as a by-product in the reaction and thereafter heating the reaction mixture until hydroxylation is substantially complete. Incomplete hydroxylation here referred to is reaction such that continued treatment will result in an increased glycerine yield from the reaction mixture and complete hydroxylation refers to reaction such that no such increase in glycerine yield results under these conditions.

The first step of the process can be carried out using any of the usual hydroxylation catalysts under conventional reaction conditions. However, it is essential that the reaction in this step of the process be conducted so that the peroxide is substantially completely reacted, i. e. at least 98% peroxide conversion, before separation of the by-product acrolein is undertaken. This is necessary not only to avoid loss of peroxide since unreacted peroxide is not recoverable but also in order to facilitate efficient removal of the acrolein since it has been found that in order to avoid undesirable reactions of the acrolein in the distillation column which interfere with distillation, the feed thereto should be essentially free of active oxygen. It is equally important, however, that reaction of the by-product acrolein be minimized in the first step of the process. To this end a low reaction temperature and a short reaction time should be used in order that the acrolein may be subjected to as little thermal treatment as possible. However, these operating variables are interrelated and the lower the temperature the longer will be the time required, under otherwise constant conditions, to obtain the required conversion of the peroxide hydroxylating agent. Other conditions which favor high rates of reaction between the peroxide and allyl alcohol without correspondingly promoting the undesirable reaction of the acrolein are high concentrations of allyl alcohol throughout the reaction and high hydroxylation catalyst concentrations. The added cost of recovery of excess allyl alcohol and catalyst and the reduction in plant capacity which occurs when too high ratios of allyl alcohol to peroxide are used, set economic upper limits to the proportions of allyl alcohol and catalyst which can be used. It is therefore advantageous to carry out the first step of the process under the following conditions:

Mole ratio allyl alcohol to peroxide: 1.0 to 5, preferably about 1.2 to about 3

Mole ratio water to peroxide: 5 to 70, preferably about 15 to about 40

Concentration of catalyst (percent w. of mixture): 0.01 to 5, preferably about 0.02 to about 0.5

Temperature: about 15° to 70° C., preferably about 35° to about 60° C.

The mechanism of reaction which appears to best fit the facts of the reaction of hydroxylation of ethylenic compounds with peroxides is that epoxidation of the ethylenic double bond is the initial reaction in most cases but hydration of the epoxide group takes place when the reaction is conducted in an aqueous medium, as in the process of the present invention. The relative rates of these reactions will vary depending upon the conditions of reaction which are employed. But the hydration reaction is generally slower than the initial reaction, so the peroxide will be substantially completely consumed before the hydroxylation is complete. The product of the first step in the process of the invention will thus usually contain glycerine and glycidol in ratios which can vary widely depending upon the reaction conditions, especially the pH of the mixture. By using, as is most advantageous, an acid tungstate catalyst at a pH between 3.0 and 7.0 as claimed in application Serial No. 494,552 previously referred to, high ratios of glycidol to glycerine can be obtained. With the usual acidic hydroxylation catalysts, on the other hand, the ratio of glycidol to glycerine will be much lower by the time the reaction of the peroxide is complete. However, whether or not glycidol is an intermediate in the reaction, it has been found to be essential to remove the acrolein formed as by-product in the reaction from the mixture as quickly as possible in order to minimize its reaction with other components of the mixture.

Removal of the by-product acrolein after the first step of the new process can be carried out in any suitable way. Distillation of the reaction mixture has been found to be an especially useful method of acrolein removal. Advantageously the excess allyl alcohol which will be present when operating according to the preferred modification of the invention is also removed before the hydroxylation is completed. This has the advantage of eliminating any tendency to form allyl glycerol ether in the final step of the process. The distillation is conducted, of course, so as to avoid undesirable reaction during removal of these compounds and is therefore carried out as a fractional distillation of the allyl alcohol and low boiling impurities as overhead product from the reaction mixture, the bottoms product being the feed to the following step in the process. The recovered allyl alcohol is advantageously recycled to the process particularly when using extractive distillation with water as a means of recovering the allyl alcohol free from undesirable impurities. The acrolein which is recovered is a valuable by-product which can be marketed.

In the final step of the process the reaction mixture, freed of acrolein, and advantageously also of excess allyl alcohol as indicated above, is treated to complete the hydroxylation reaction. This step can be carried out under the same conditions as are used for the initial reaction but is more advantageously carried out at a higher temperature than that employed in the first step of the process in order to shorten the time for completion of the hydroxylation. Temperatures of about 80° to about 200° C. are suitable, more generally it is preferable to use temperatures of about 100° to about 175° C. for the reaction. This step of the process is accelerated by acid conditions and particularly when the first step of the reaction is carried out at pH 3 or higher it is advantageous to acidify the reaction mixture to reduce the pH to about 1.5 or less in order to promote more rapid completion of the hydroxylation. In all cases it is desirable as a rule to conduct the last step of the process at pH below 7.

On completion of the hydroxylation the glycerine can be recovered in any suitable way. Simple distillation and evaporation combined with a treatment with activated carbon gives exceptionally pure glycerine.

The attached drawing is a simplified flow sheet illustrating schemically one suitable way of carrying out the new process. The apparatus shown in the drawing is not to scale and the necessary pumps and other auxiliary equipment have been omitted in the interest of clarity.

In the drawing, 1 represents a hydroxylation reactor which can be of any suitable design for batch, intermittent or continuous reaction. A tank having agitating means and provided with temperature control means, for instance a cooling coil or jacket, is one form of reactor which has been found satisfactory, but a plurality of reactors in series or a coil or other type of reactor capable of promoting intimate contact between the reactants under controlled temperature conditions can be used. Line 2 is a supply line for feeding peroxide to the reactor, while line 3 is the allyl alcohol feed line from a source not shown. The peroxide is fed as an aqueous solution, aqueous hydrogen of about 5% to about 50% concentration, for instance, being suitable. As previously indicated the allyl alcohol is used in molar excess, preferably a substantial molar excess based on the hydrogen peroxide used. The catalyst for the reaction is supplied by line 4 and can be any of the known hydroxylation catalysts previously referred to but is most advantageously a tungstic catalyst by which is meant a tungstic acid, i. e. tungstic acid itself or a heteropoly acid of tungsten, or a salt of tungstic acid or of a heteropoly acid of tungsten. Preferred heteropoly tungstic acids are acids containing at least one element of groups V and VI of the periodic table, particularly phosphorus, bismuth, selenium and molybdenum as the other hetero atom. Among the tungstic salt catalysts, which can be neutral or more advantageously acid salts, the alkali or alkaline earth metal salts are preferred. Sodium acid tungstate is an especially useful catalyst. The tungstic salts can be added as such or can be formed in situ by adding the corresponding acid and also the required amount of base to form the acid or neutral salt as desired. Acid salts may, alternatively, be formed in situ by feeding in a neutral tungstate and a suitable amount of acid. Mixtures of two or more of these tungstic catalysts can be used with or without one or more other hydroxylation catalysts.

After reaction in reactor 1, as previously described, to substantially completely convert the peroxide without completion of the hydroxylation, the reaction mixture which is preferably essentially free of unreacted peroxide, is taken off by line 5 to a fractionating column 6. Column 6 is shown as having an inlet line 7 for feeding water near the top of the column to provide an extractive distillation section in which allyl alcohol is separated from acrolein and other low boiling impurities. The column is provided with a catch tray, not shown, from which aqueous allyl alcohol is taken off as a side stream by line 8 and returned to reactor 1 to provide the required excess allyl alcohol and dilution water for the reaction. The acrolein and other impurities thus separated from the allyl alcohol are taken off as overhead product by line 9 and removed from the system. The bottoms product of the distillation taken off by line 10 will be an acrolein- and allyl alcohol-free aqueous solution usually representing about 75 to 95% of the effluent from unit 1. Instead of carrying out the distillation in the column shown, equally good results can be obtained by first distilling off the allyl alcohol, acrolein and low boiling impurities and extractively distilling this distillate separately with water to recover allyl alcohol for recycling. Alternatively the extractive distillation can be omitted at a sacrifice in allyl alcohol recovery and/or purity of the recycled allyl alcohol and a pasteurization section used for separating the acrolein and other light ends from the allyl alcohol. It is also feasible to omit the recycle of allyl alcohol and to take off overhead by line 9 the acrolein together with the allyl alcohol and some of the water. In such a method of operation the amount of allyl alcohol supplied by line 3 will be proportionally increased and an increased amount of dilution water will be fed to reactor 1, for example with the peroxide introduced by line 2 or by one of the other feed lines or a separate line not shown. The distillation of the reaction mixture can be carried out at atmospheric or higher or lower pressure. Column head pressures of the order of about 20 to about 50 p. s. i. g. offer certain advantages. By proper control the distillation can be used to effect further hydroxylation in the lower section of the column and/or in the column reboiler (not shown) where acrolein and allyl alcohol concentrations are lowest, especially when operating under superatmospheric pressure, but as previously pointed out, it is desirable that the operation be conducted in the substantial absence of hydrogen peroxide or the like in order to avoid undesirable side reactions, particularly polymerization of the acrolein.

In the final reaction unit, 11, which can be a reactor of the types described as suitable for carrying out the first stage of reaction, the hydroxylation is completed by further heating of the reaction mixture introduced by line 10. As previously indicated the heating in this step of the process can be at about the same temperature as that employed in reactor 1 or, usually more advantageously, at a higher temperature. Line 12 is provided for the addition of pH control agents, with or without additional water, for promoting more rapid reaction. Phosphoric acid, sulfuric acid, sodium carbonate and sodium bicarbonate are typical examples of pH control agents which are suitable. Thus in a typical case in which about 3 hours heating at 100° C. in reactor 11 was required for completion of the hydroxylation, the time was reduced to 12 minutes by addition of a small amount of phosphoric acid, and to 30 minutes by adding the same amount of sulfuric acid or sodium carbonate, while with sodium bicarbonate in the same amount of the time required with one hour. When sodium hydroxide was used although there was no reduction in the reaction time required the yield of glycerine produced increased slightly. Completion of the hydroxylation can be readily determined by simple test, for instance when further heating of a sample for an hour at about 150° C. shows no additional production of glycerine. Continued heating beyond the time necessary for completion of the reaction is usually undesirable and of course such heating reduces plant capacity. The time of heating which will be necessary is less the higher the temperature used. Thus at temperatures of about 100° to about 175° C., for example, hydroxylation is usually complete in about 180 to about 5 minutes when the pH is in the range of about 5 to 6. On completion of the hydroxylation the product is drawn off by line 13 for recovery in any suitable way.

The following examples illustrate in more detail some typical applications of the new process.

EXAMPLE I

Glycerine was produced using a hydroxylation reactor (1 in the drawing) consisting of three vessels of about 10 liters capacity each, provided with internal heat exchange coils. Each vessel was equipped with a 4-liter-per-minute circulating pump. The feed streams of allyl alcohol aqueous (20–27%) hydrogen peroxide, dilution water, aqueous catalyst solution and 1.0 normal sodium hydroxide for pH control were fed to the first of these vessels which then overflowed by gravity into the other two vessels successively. The reactor effluent from the third vessel was piped directly to a distillation column (5 in the drawing) having 12 bubble plates below and 11 bubble plates above the feed port and equipped with a reflux condenser and reciler. An overhead product consisting of allyl alcohol-water constant boiling mixture, acrolein and lower boiling components was taken off. The bottoms product stream from the column was pumped to a steam jacketed pipe reactor (10 in the drawing) eight feet long and of 1¼ inch inside diameter, operated at about 110 p. s. i. g. pressure. The reaction product of the pipe reactor was passed through a cooler to a storage tank from which samples for analysis were collected before recovery of the glycerine in a pure concentrated form by evaporation and distillation to remove light and heavy ends.

Operating conditions were as follows:

*First hydroxylation stage*

| | |
|---|---|
| Mole ratio allyl alcohol to $H_2O_2$ | 1.5:1. |
| Mole ratio water to $H_2O_2$ | 33.5:1. |
| Catalyst: | |
| $H_2WO_4$ | 0.5%, percent w. in feed. |
| NaOH | 0.083%, percent w. in feed. |
| Temperature | 45° C. |
| Residence time | 3.3 hours. |
| pH | 5.5–6.1. |
| Conversion of $H_2O_2$ | 99.1%. |

*Distillation*

| | |
|---|---|
| Temperature: | |
| 5th plate above feed port | 92–93° C. |
| Reboiler | 102–104° C. |
| Reflux ratio | 5:1. |
| Residence time in lower stripping section | 8 minutes. |
| Overhead product | Allyl alcohol CBM+ acrolein and lower boiling components. |

*Final hydroxylation stage*

| | |
|---|---|
| Temperature ° Centigrade | 145 |
| Residence time minutes | 10 |
| pH: | |
| Initial | 6.4 |
| Final | 5.9 |

Under these conditions the glycerol yield was 88.2 mole percent based on the allyl alcohol converted and 85.2 mole percent based on the hydrogen peroxide fed to the system. Acrolein production was 2.72 mole percent based on the hydrogen peroxide fed. The glycerine produced analyzed as follows:

| | |
|---|---|
| Fatty acids and esters, eq./100 grams | 0.0001 |
| Carbonyl, eq./100 grams | 0.0002 |
| RCS value | 1.3 (pass) |
| Acrolein, glucose and ammonia | 0.5 |
| Color (USP XIV) | 10 Hazen |
| Glycerine, percent by weight | 99 |
| Water, percent by weight | 0.1 |

Reaction in the same way but without distillation of the product from the first hydroxylation stage before completion of the hydroxylation in the final reaction stage, gave a glycerine yield of 86.8 mole percent based on allyl alcohol converted and 84.7 mole percent based on the hydrogen peroxide fed to the system, and the glycerine produced was less pure than in the method of the invention as shown by the following figures:

| | |
|---|---|
| Fatty acids and esters, eq./100 grams | 0.0007 |
| Carbonyl, eq./100 grams | 0.0002 |
| RCS value | 2.7 (fail) |
| Acrolein, glucose and ammonia | 0.7 |
| Color (USP XIV) | 15 Hazen |

Similar improved results are obtained when reacting in the same way but using a 23-foot packed distillation column provided with an extractive distillation section at the top and having a catch tray drain off for removal of the allyl alcohol solution as a side stream which was recycled to the first hydroxylation stage.

EXAMPLE II

A test was made using sodium tungstate as the catalyst (0.588% of $Na_2WO_4$ by weight of the reaction mixture) in single stage reaction at 45° C. with a mole ratio of allyl alcohol to hydrogen peroxide of 1.5:1 and a mole ratio of water to hydrogen peroxide of 33.5:1 and a residence time of 8.8 hours at which point the hydrogen peroxide conversion was 99% complete but the hydroxylation only about 14% complete as determined by analysis of the reaction mixture for glycerine. The mixture was then distilled to remove acrolein and allyl alcohol and the hydroxylation was then completed by heating at 100° C. The following results were obtained:

Glycerine yield:
    Mole percent based on $H_2O_2$ fed_____ 81.9
    Mole percent based on allyl alcohol converted_ 89.5
Acrolein yield, mole percent based on $H_2O_2$ fed___ 0.84
Conversion of allyl alcohol_____ 61.4

Similar reaction using mole ratios of allyl alcohol and water to hydrogen peroxide of 3.0:1 and 28.4:1 and a residence time in the initial stage of reaction before removal of acrolein and allyl alcohol resulted in a glycerine yield of 81.2 mole percent and an acrolein yield of 2.9 mole percent, both based on hydrogen peroxide fed to the reactor.

Without removal of these amounts of acrolein prior to completion of the hydroxylation, not only is the acrolein lost but also its further reactions with the other components of the mixture reduces the yields and complicates purification of the glycerine.

Using a sodium acid phosphotungstate catalyst in the amount of about 0.3% by weight of the reaction mixture, similar good results are obtained by two-stage reaction with removal of the by-product acrolein between reaction stages as described in Example I.

It will be seen that the process of the invention offers substantial advantages over prior methods of hydroxylating allyl alcohol. The process is capable of considerable variation not only with respect to the type of hydroxylation catalyst which can be used but also in regard to the operating conditions which can be employed in the two reaction stages and the intermediate acrolein separation step. The invention will therefore be recognized as not restricted to the details of operation which have been described by way of illustration, nor by any theory proposed in explanation of the advantageous results which are obtained.

We claim as our invention:

1. A process of producing glycerine which comprises reacting allyl alcohol with hydrogen peroxide in an aqueous medium in the presence of a hydroxylation catalyst at about 15° to 70° C. using a mole ratio of allyl alcohol to peroxide of about 1:1 to 5:1, a mole ratio of water to peroxide of about 5:1 to 70:1 and a concentration of catalyst of about 0.01 to 5% by weight of the mixture for a time at which substantially complete reaction of the hydrogen peroxide takes place with formation of a minor amount of by-product acrolein but hydroxylation is incomplete, substantially separating said acrolein from the reaction mixture and heating the reaction mixture until hydroxylation is complete.

2. A process in accordance with claim 1 wherein the reaction is carried out with a substantial molecular excess of allyl alcohol to hydrogen peroxide.

3. A process in accordance with claim 2 wherein the by-product acrolein is separated prior to completion of the hydroxylation by distilling the initial reaction mixture to remove therefrom the excess allyl alcohol and lower boiling components of the mixture.

4. A process in accordance with claim 1 wherein the reaction is carried out with a tungstate catalyst.

5. A process in accordance with claim 4 wherein the hydroxylation is completed by heating the reaction mixture at about 80° to 175° C. after removal of the acrolein.

6. A process for producing glycerine which comprises reacting allyl alcohol and hydrogen peroxide in a mole ratio of 1.2:1 to 3:1 in an aqueous solution containing a water-soluble salt of a tungstic acid as hydroxylation catalyst of concentration about 0.01 to about 0.5% by weight of the mixture at a temperature of about 35° to about 60° C. until substantially complete reaction of the hydrogen peroxide has taken place with formation of a minor amount of by-product acrolein but hydroxylation is incomplete, distilling the reaction mixture to remove therefrom acrolein and unreacted allyl alcohol and heating the distillation bottoms product at about 100° C. to about 200° C. to complete the hydroxylation.

7. A process in accordance with claim 6 wherein the catalyst is sodium acid tungstate present in an amount of about 0.01% to about 5% by weight of the reaction mixture.

8. A process in accordance with claim 6 wherein the reaction mixture is freed of excess allyl alcohol before said heating to complete the hydroxylation.

References Cited in the file of this patent

UNITED STATES PATENTS

| | | |
|---|---|---|
| 2,373,942 | Bergsteinsson | Apr. 17, 1945 |
| 2,500,599 | Bergsteinsson | Mar. 14, 1950 |
| 2,613,223 | Young | Oct. 7, 1952 |

FOREIGN PATENTS

| | | |
|---|---|---|
| 921,446 | Germany | Nov. 11, 1954 |

OTHER REFERENCES

Mugdan et al.: J. Chem. Soc. (London), pages 2988–3000 (1949).

Byers et al.: Ibid., pages 1328–36 (1948).

Fuson: "Advanced Organic Chemistry," Wiley, New York, N. Y., 1950, pages 368–9.